United States Patent
Davis et al.

(10) Patent No.: US 7,360,905 B2
(45) Date of Patent: Apr. 22, 2008

(54) COMPACT OPTICAL ENGINE FOR VERY SMALL PERSONAL PROJECTORS USING LED ILLUMINATION

(75) Inventors: Michael T. Davis, Richardson, TX (US); D. Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 22 days.

(21) Appl. No.: 11/165,906

(22) Filed: Jun. 24, 2005

(65) Prior Publication Data

US 2006/0290899 A1  Dec. 28, 2006

(51) Int. Cl.
*G02F 1/13357* (2006.01)
*G03B 21/28* (2006.01)

(52) U.S. Cl. .............. 353/81; 353/20; 353/94; 349/62; 348/771; 362/555

(58) Field of Classification Search .......... 353/28, 353/20, 31, 33, 81, 102, 94, 119; 348/771, 348/762, 800; 362/555, 559–561; 349/62
See application file for complete search history.

(56) References Cited

U.S. PATENT DOCUMENTS

| | | | |
|---|---|---|---|
| 5,309,188 A | | 5/1994 | Burstyn |
| 5,829,858 A | * | 11/1998 | Levis et al. ............... 353/122 |
| 6,164,789 A | * | 12/2000 | Unger et al. .............. 362/610 |
| 6,227,669 B1 | * | 5/2001 | Tiao et al. ................. 353/31 |
| 6,799,849 B2 | * | 10/2004 | Kim et al. ................. 353/30 |
| 2003/0123162 A1 | * | 7/2003 | Penn ........................ 359/833 |
| 2004/0057023 A1 | * | 3/2004 | Colpaert .................... 353/85 |
| 2004/0207816 A1 | * | 10/2004 | Omoda et al. ............. 353/31 |
| 2004/0227899 A1 | * | 11/2004 | Kurosaka et al. ......... 353/30 |

* cited by examiner

*Primary Examiner*—Andrew T Sever
(74) *Attorney, Agent, or Firm*—Wade James Brady, III; Frederick J. Telecky, Jr.

(57) ABSTRACT

According to various illustrative embodiments of the present invention, a device for a light projection system includes a single light emitting diode array comprising at least one green die, at least one blue die, and at least one red die, a single light collection, integration, and etendue-matching optic element comprising a tapered light pipe capable of collecting substantially all light emitted by the single light emitting diode array and spatially integrating the substantially all the light emitted by the single light emitting diode array, and a telecentric relay using at least one of spherical and aspherical refractive and reflective components. The device also includes an illumination wedge prism, a digital micromirror device capable of modulating the substantially all the light emitted by the single light emitting diode array, and a projection total internal reflection prism, the projection total internal reflection prism disposed between the illumination wedge prism and the digital micromirror device. The device also includes a projection lens, wherein the telecentric relay provides the substantially all the light emitted by the single light emitting diode array through the illumination wedge prism and through the projection total internal reflection prism to the digital micromirror device that reflects the substantially all the light emitted by the single light emitting diode array back through the projection total internal reflection prism that totally internally reflects the substantially all the light emitted by the single light emitting diode array through the projection lens.

20 Claims, 4 Drawing Sheets

COMPACT OPTICAL ENGINE FOR VERY SMALL PERSONAL PROJECTORS USING LED ILLUMINATION

TECHNICAL FIELD OF THE INVENTION

This invention relates to compact optical engine for very small personal projectors using light emitting diode (LED) illumination.

BACKGROUND OF THE INVENTION

Conventional attempts to use light emitting diode (LED) technology for small, "pocket-sized" or personal projection devices have relied on optical engine technologies that were developed for conventional arc lamp and color wheel illumination systems for single-panel digital micromirror devices (DMDs). However, the optical engine technologies that were developed for conventional arc lamp and color wheel illumination systems for single-panel digital micromirror devices (DMDs) are not optimized for form, size, function, or performance when using light emitting diode (LED) sources. For example, one major way that light emitting diode (LED) sources differ from arc lamps is that, though the emission area of a light emitting diode (LED) source is small, the light emitting diode (LED) sources emit into a very large angular space. This requires very different collection and relay optics for optimum size and efficiency from the conventional collection and relay optics used in arc lamp systems.

SUMMARY OF THE INVENTION

According to various illustrative embodiments of the present invention, a device for a light projection system includes a single light emitting diode array comprising at least one green die, at least one blue die, and at least one red die, a single light collection, integration, and etendue-matching optic element comprising a tapered light pipe capable of collecting substantially all light emitted by the single light emitting diode array and spatially integrating the substantially all the light emitted by the single light emitting diode array, and a telecentric relay using at least one of spherical and aspherical refractive and reflective components. The device also includes an illumination wedge prism, a digital micromirror device capable of modulating the substantially all the light emitted by the single light emitting diode array, and a projection total internal reflection prism, the projection total internal reflection prism disposed between the illumination wedge prism and the digital micromirror device. The device also includes a projection lens, wherein the telecentric relay provides the substantially all the light emitted by the single light emitting diode array through the illumination wedge prism and through the projection total internal reflection prism to the digital micromirror device that reflects the substantially all the light emitted by the single light emitting diode array back through the projection total internal reflection prism that totally internally reflects the substantially all the light emitted by the single light emitting diode array through the projection lens.

Some embodiments of the present invention provide numerous technical advantages. Other embodiments may realize some, none, or all of these advantages. For example, various illustrative embodiments may provide a device for a light projection system that creates a very compact optical system for a 0.55 inch (0.55") panel diagonal digital micromirror device (DMD), having a form factor that remains no more than about 35 mm in thickness, with a total optical engine volume of no more than about 80 cc. A total projector using such a device for a light projection system, including electronics, a digital micromirror device (DMD) and a thermal solution to dissipate heat produced may have a total volume of no more than about 200 cc, weigh no more than about 1 lb, and be able to fit in a pocket and/or a purse. The brightness of such a projector using such a device for a light projection system may be no less than about 15 to about 20 lumens, and battery operation of such a projector may be in a range of about 2 to about 4 hours, so power consumption of the sources and the thermal solution may be minimal.

Similarly, various illustrative embodiments may provide a device for a light projection system that may use a single light emitting diode (LED) array, comprising at least one green die, at least one blue die, and at least one red die, disposed on a single high-power thermal package in such a way as to minimize substantially the power consumption and the optical complexity, and, thus, the overall size, weight, and volume of the light projection system. A single light collection, integration, and etendue-matching optic element comprising a tapered light pipe may be enabled by the single light emitting diode (LED) array, and may be compact, simple, and inexpensive. Coupling the at least one green die, the at least one blue die, and the at least one red die in air instead of using a conventional index-matching sealant may improve the optical efficiency and may enable use of the simple single light collection, integration, and etendue-matching optic element comprising the tapered light pipe.

A telecentric relay using at least one of spherical and aspherical refractive and reflective components may substantially minimize the overall volume and may also provide a pupil for controlling stray light. The telecentric relay may be manufacturable using relatively inexpensive technologies and/or materials due to the relatively low light levels.

In addition, using a coupling prism assembly comprising the right angle projection total internal reflection (TIR) prism and an illumination wedge prism may allow compact folding of the optical path within a single plane layout, in spite of the digital micromirror device (DMD) hinge axis being at about 45 degrees to the package. Moreover, using the coupling prism assembly may simplify assembly and substantially lower the cost and/or size/volume of a telecentric system by using standardized tooling, such as a 90 degree (right angle) projection total internal reflection (TIR) prism, and allowing reduction of projection lens offset to substantially the minimum field size required for market requirements and/or specifications. Furthermore, a plethora of standard liquid crystal display (LCD) lens designs may also be made applicable thereby.

Other technical advantages will be readily apparent to one of ordinary skill in the art having the benefit of the present disclosure, including the following figures, descriptions, and claims.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present invention and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
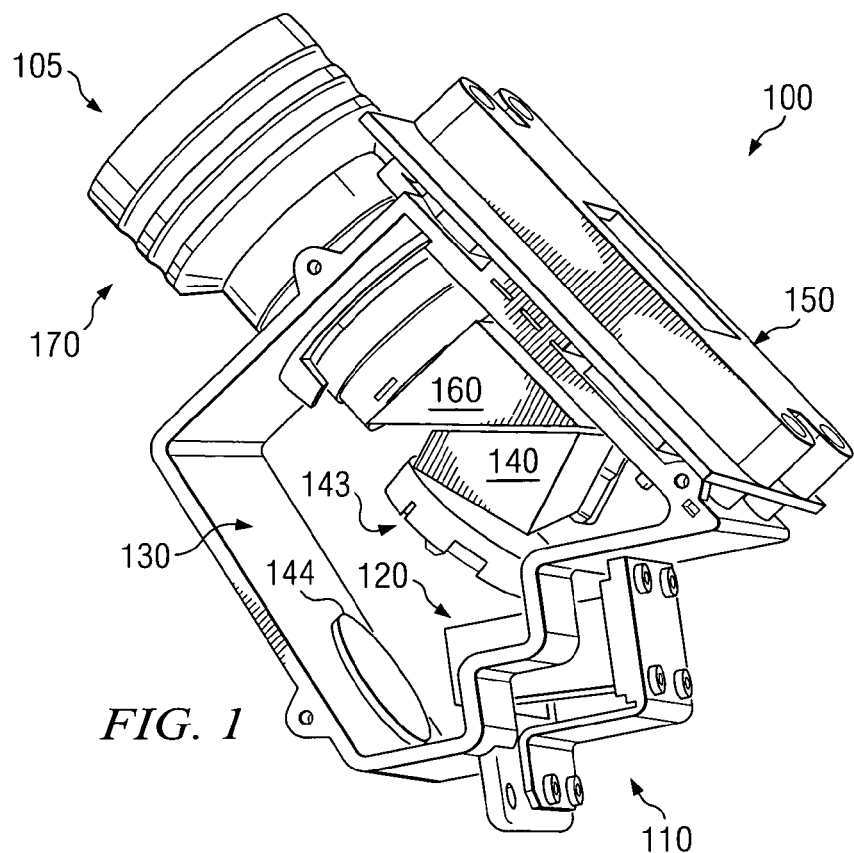
FIG. 1 schematically illustrates a perspective view of a device for a light projection system, according to various exemplary embodiments of the present invention.
Figure 2:
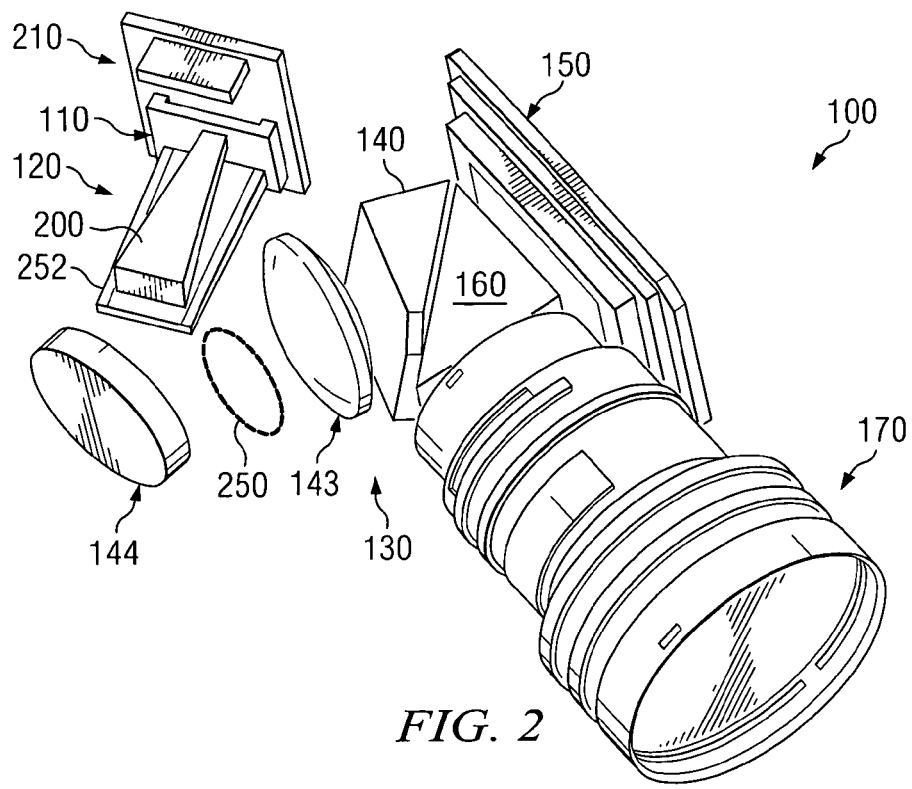
FIG. 2 schematically illustrates another perspective view of the device for the light projection system shown in FIG. 1.
Figure 6:
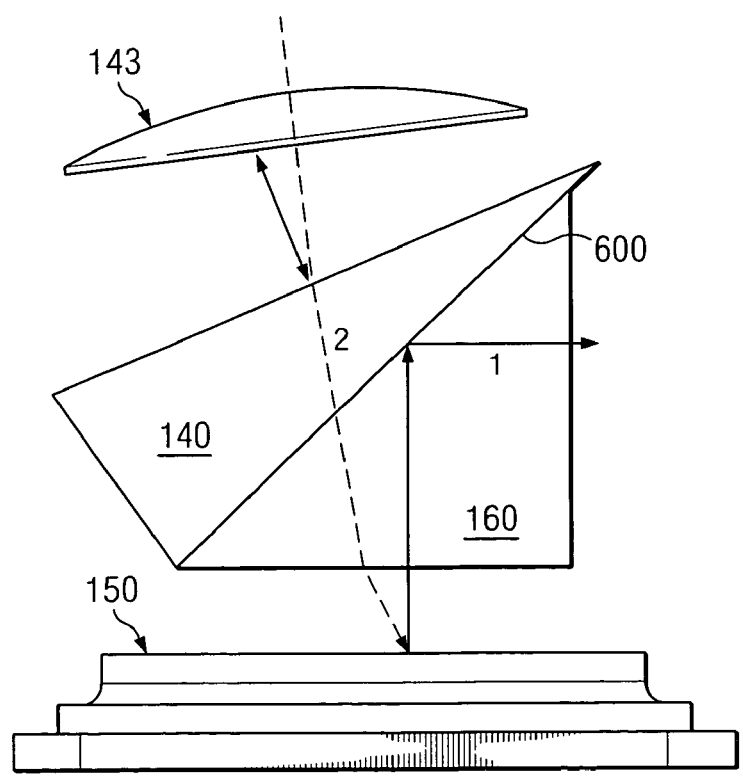
FIG. 6 schematically illustrates an optical path through the coupling prism assembly shown in FIG. 5.
Figure 7:
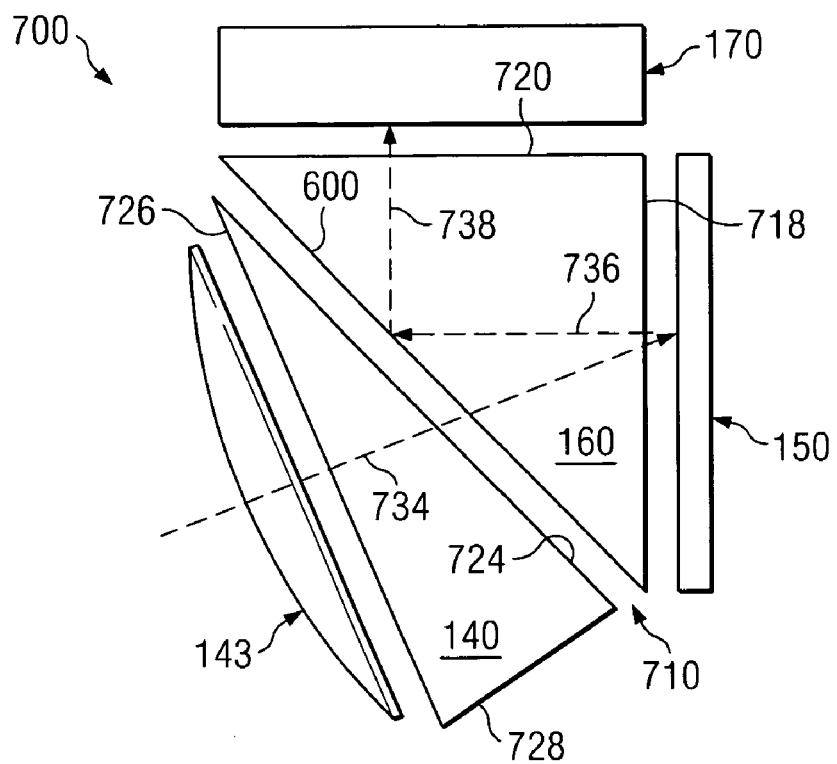
FIG. 7 schematically illustrates another optical path through the coupling prism assembly shown in FIG. 5, including an air gap between the prisms.
Figure 8:
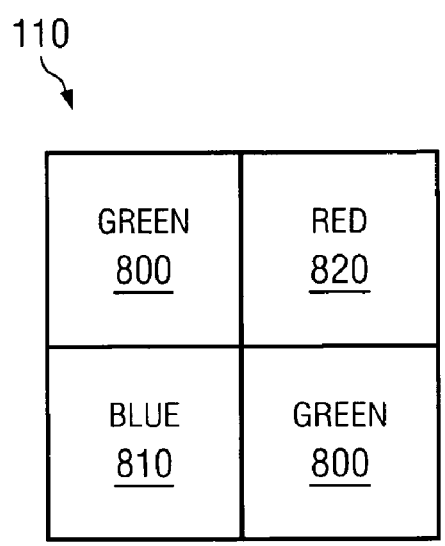
FIG. 8 schematically illustrates an exemplary embodiment of the single light emitting diode (LED) array used in the device for the light projection system shown in FIGS. 1-4.

In various illustrative embodiments, as shown, for example, in FIGS. 1-8, a device 100 may be provided for a light projection system 105. As shown in FIGS. 1 and 8, the device 100 for the light projection system 105 may comprise a single light emitting diode (LED) array 110, as shown in FIG. 8 comprising at least one green die 800, at least one blue die 810, and at least one red die 820. In various particular illustrative embodiments, the device 100 for the light projection system 105 may comprise at least two green dice 800 (as used herein, "dice" is the plural of "die"), at least one blue die 810, and at least one red die 820. In various particular illustrative exemplary embodiments, the device 100 for the light projection system 105 may comprise two green dice 800, one blue die 810, and one red die 820, as shown in FIG. 8, for example. In various illustrative embodiments, the single light emitting diode (LED) array 110 may be disposed, as shown in FIG. 2, on a single high-power package 210 capable of thermally operating the single light emitting diode (LED) array 110 at substantially maximum lumens while maintaining substantial color balance.

Figure 3:
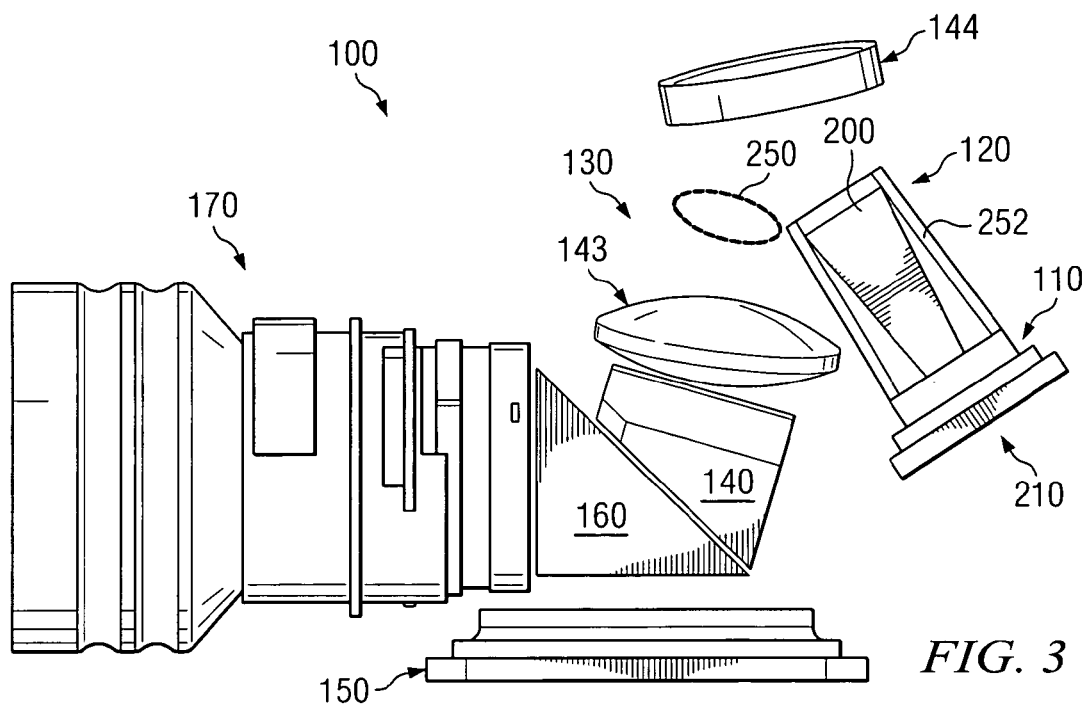
FIG. 3 schematically illustrates a top perspective view of the device for the light projection system shown in FIGS. 1 and 2.
Figure 4:
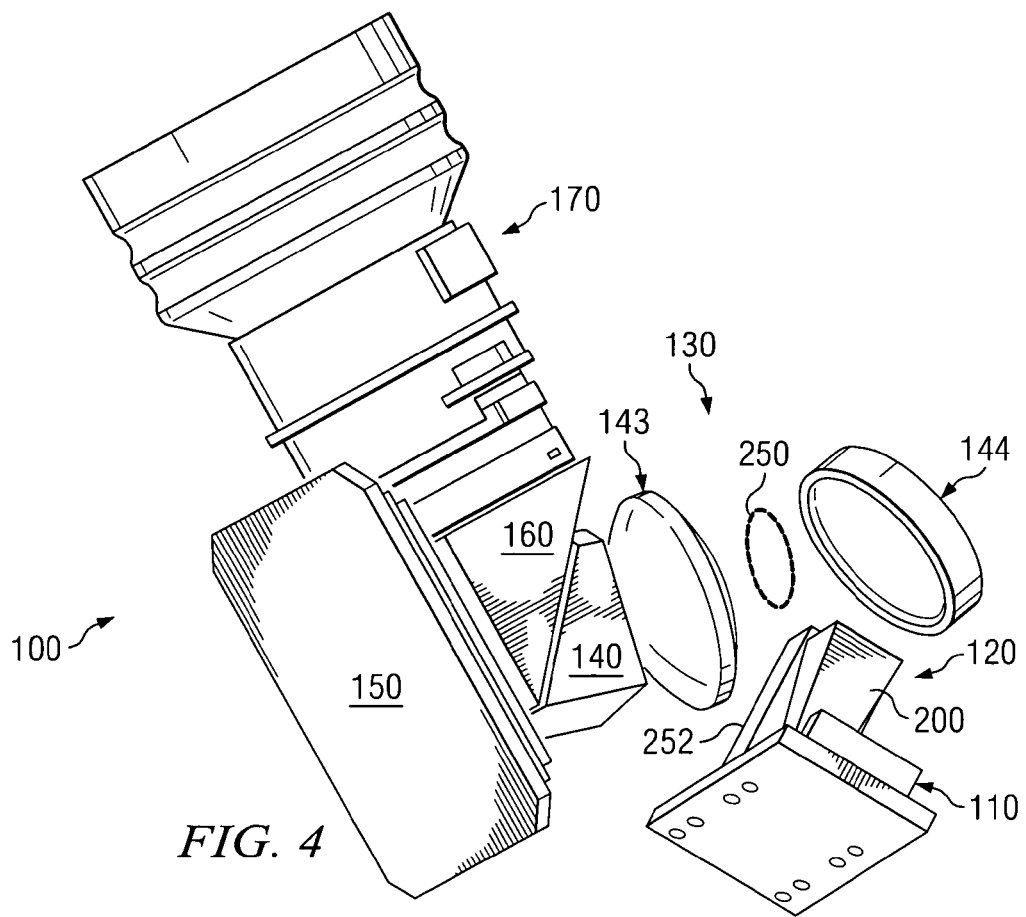
FIG. 4 schematically illustrates another perspective view of the device for the light projection system shown in FIGS. 1, 2, and 3.

The device 100 for the light projection system 105 may also comprise a single light collection, integration, and etendue-matching optic element 120 comprising a tapered light pipe 200 and an illuminator holder 252, as shown FIGS. 2-4, capable of collecting substantially all light emitted by the single light emitting diode (LED) array 110 and spatially integrating substantially all the light emitted by the single light emitting diode (LED) array 110. Etendue, as one of ordinary skill in the art having the benefit of the present disclosure would know, is the product of the area of emission and the solid angle emitted into. The illuminator holder 252 may be used to fix the tapered light pipe 200 to the single light emitting diode (LED) array 110 disposed on the single high-power package 210. In various illustrative embodiments, the single light collection, integration, and etendue-matching optic element 120 comprising the tapered light pipe 200 may also be capable of collecting substantially all light emitted by the single light emitting diode (LED) array 110 and spatially integrating substantially all the light emitted by the single light emitting diode (LED) array 110 so the white point is substantially uniform and the intensity is substantially evenly distributed.

In various particular illustrative embodiments, the single light collection, integration, and etendue-matching optic element 120 comprising the tapered light pipe 200 may also be capable of reducing the angular output of substantially all the light emitted by the single light emitting diode (LED) array 110. In various illustrative exemplary embodiments, the single light collection, integration, and etendue-matching optic element 120 comprising the tapered light pipe 200 may also be capable of reducing the angular output of substantially all the light emitted by the single light emitting diode (LED) array 110 to a half angle of no more than about 45 degrees. In various particular illustrative exemplary embodiments, the single light collection, integration, and etendue-matching optic element 120 comprising the tapered light pipe 200 may also be capable of reducing the angular output of substantially all the light emitted by the single light emitting diode (LED) array 110 to a half angle of no more than about 24 degrees.

The device 100 for the light projection system 105 may also comprise a telecentric relay 130 using spherical or aspherical refractive 143 and reflective 144 components, as shown FIGS. 1-4. In various illustrative embodiments, the telecentric relay 130 using the spherical or aspherical refractive 143 and reflective 144 components may also have a pupil 250, as shown in phantom in FIGS. 2-4, disposed appropriately between the spherical or aspherical refractive 143 and reflective 144 components, for controlling stray light.

Figure 5:
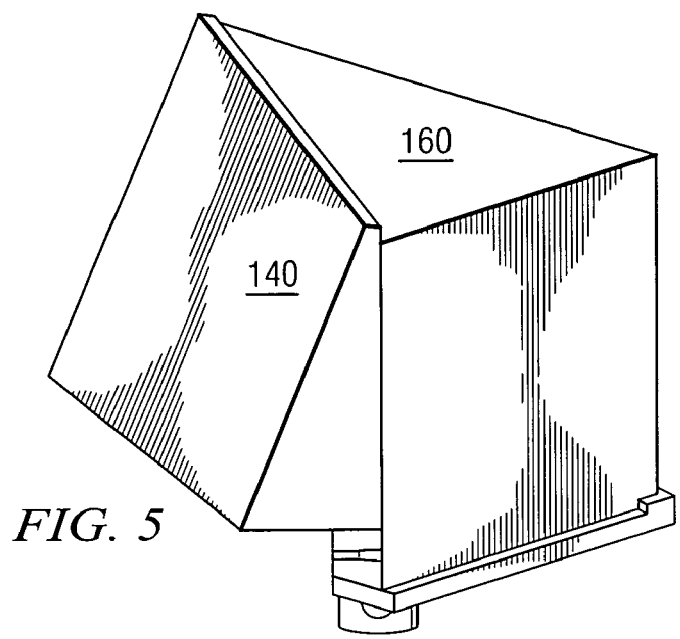
FIG. 5 schematically illustrates an exemplary embodiment of a coupling prism assembly used in the device for the light projection system shown in FIGS. 1-4.

The device 100 for the light projection system 105 may also comprise an illumination wedge prism 140, as shown FIGS. 5-7. The device 100 for the light projection system 105 may also comprise a digital micromirror device (DMD) 150 capable of modulating substantially all the light emitted by the single light emitting diode (LED) array 110. The device 100 for the light projection system 105 may also comprise a projection total internal reflection (TIR) prism 160, the projection total internal reflection prism 160 disposed between the illumination wedge prism 140 and the digital micromirror device (DMD) 150. In various illustrative embodiments, as shown FIG. 7, the projection total internal reflection (TIR) prism 160 may be separated by an air gap 710 from the illumination wedge prism 140.

The device 100 for the light projection system 105 may also comprise a projection lens 170, wherein the telecentric relay 130 provides substantially all the light emitted by the single light emitting diode (LED) array 110 through the illumination wedge prism 140 and through the projection total internal reflection (TIR) prism 160 to the digital micromirror device (DMD) 150 that reflects substantially all the light emitted by the single light emitting diode (LED) array 110 back through the projection total internal reflection (TIR) prism 160 that totally internally reflects substantially all the light emitted by the single light emitting diode (LED) array 110 through the projection lens 170. In various illustrative embodiments, the telecentric relay 130 provides substantially all the light emitted by the single light emitting diode (LED) array 110 through the illumination wedge prism 140, across the air gap 710, and through the projection total internal reflection (TIR) prism 160 to the digital micromirror device (DMD) 150 that reflects substantially all the light emitted by the single light emitting diode (LED) array 110 back through the projection total internal reflection (TIR) prism 160 that totally internally reflects substantially all the light emitted by the single light emitting diode (LED) array 110 through the projection lens 170.

In various exemplary illustrative embodiments, the device 100 for the light projection system 105 may comprise the single light emitting diode (LED) array 110 comprising four dice, the two green dice 800, the one blue die 810, and the one red die 820, as shown in FIG. 8, for example. The single light emitting diode (LED) array 110 may be disposed, as shown in FIG. 2, on a single high-power package 210 capable of thermally operating the single light emitting diode (LED) array 110 at substantially maximum lumens while still maintaining a substantially proper color balance. Each of the four dice 800, 810, and 820 may be about 1 square mm in emitting area, and may be arranged in about a 1.1 mm square pitch to about a 1.2 mm square pitch, with each of the two green dice 800 arranged on a diagonal as shown in FIG. 8, for example.

In these various exemplary illustrative embodiments, the etendue of the digital micromirror device (DMD) 150 panel may be about 12 square mm steradian, which means that substantially all of the output of the single light emitting diode (LED) array 110 may be coupled into the digital micromirror device (DMD) 150. However, the addition of more dice than the four dice 800, 810, and 820 may decrease the collectible angular output from each of the die and may increase the power consumption and/or exceed the thermal capacity of the single high-power package 210. The various exemplary illustrative embodiments with no more than the four dice 800, 810, and 820 may be substantially optimal, particularly for small applications, such as very compact optical engines for small personal projectors.

In these various exemplary illustrative embodiments, the single light collection, integration, and etendue-matching optic element 120 may comprise the tapered light pipe 200 that may (1) collect substantially all the light emitted by each of the four dice 800, 810, and 820 of the single light emitting diode (LED) array 110, (2) spatially integrate substantially all the light collected so the white point is substantially uniform and the intensity substantially evenly distributed, and (3) reduce the angular output of substantially all the light collected and spatially integrated to a half angle of no more than about 24 degrees so that substantially all the light collected and spatially integrated may be relayed to the digital micromirror device (DMD) 150 with conventional optics. Optical modeling has shown that operating each of the four dice 800, 810, and 820 without an epoxy sealant, using an air space, may increase the optical efficiency by as much as about 50%. By contrast, most conventional approaches have each light emitting diode (LED) die in a separate package and combine the light emitted by each through a dichroic combining filter system after a collection and collimating optic element, which makes the volume for the light sources up to at least three times larger than in these various exemplary illustrative embodiments described herein.

One of the challenges in the approach taken with these various exemplary illustrative embodiments is spatially integrating the color from each of the four dice 800, 810, and 820, since each color is off-axis from the optical system, and, in the case of the single blue die 810 and/or the single red die 820, has no axis of symmetry with the optical system. When the tapered light pipe 200 of the single light collection, integration, and etendue-matching optic element 120 is placed very near the output of each of the four dice 800, 810, and 820 and operated with an air spacing, without an epoxy sealant, for example, substantially all of the useful light is collected from each of the four dice 800, 810, and 820 and is very well spatially integrated before exiting the tapered light pipe 200. The tapered light pipe 200 substantially thoroughly mixes the colors and the intensities of substantially all of the useful light collected from each of the four dice 800, 810, and 820, and substantially evenly spreads out both the colors and their respective intensities.

The single light collection, integration, and etendue-matching optic element 120 having the tapered light pipe 200 may be disposed in a very small volume, and the tapered light pipe 200 may be formed from a single relatively inexpensive moldable plastic optic element. In various illustrative embodiments, the tapered light pipe 200 may be substantially hollow and be mirrored on the inside to reflect substantially all of the useful light collected from each of the four dice 800, 810, and 820. In various alternative illustrative embodiments, the tapered light pipe 200 may be substantially solid plastic or glass, and use total internal reflection (TIR) to reflect substantially all of the useful light collected from each of the four dice 800, 810, and 820.

In these various exemplary illustrative embodiments, the output of the tapered light pipe 200 may be shaped to match substantially all of the useful light from each of the four dice 800, 810, and 820 to the digital micromirror device (DMD) 150 through a telecentric relay 130 system and the illumination wedge prism 140. The telecentric relay 130 system may magnify the image by a factor of about two, for example, preserving the etendue, so that the angular output of substantially all the light collected and spatially integrated may be reduced to a half angle of no more than about 12 degrees. Both the folding mirror, the reflective 144 component, and the lens, the refractive 143 component, may be aspherical to minimize distortion, but remain easily moldable. The power mirror 144 serves both as an optical power element and a folding device for compactness of the layout. The telecentric relay 130 may be telecentric at each end, which further enables a reduction in the size of the projection lens 170, as described more fully below.

The illumination wedge prism 140 and the projection total internal reflection (TIR) prism 160 may be arranged as described in U.S. Pat. No. 5,309,188 to Burstyn, which is hereby incorporated by reference herein. As shown in FIGS. 5-7, for example, the projection total internal reflection (TIR) prism 160 may be a 90 degree prism that reflects the image to the projection lens 170 by total internal reflection off the hypotenuse 600 of the projection total internal reflection (TIR) prism 160.

In FIG. 7, for example, a coupling prism assembly 700 may be mounted adjacent the digital micromirror device (DMD) 150. The coupling prism assembly 700 may comprise the right angle projection total internal reflection (TIR) prism 160 and the illumination wedge prism 140. The right angle projection total internal reflection (TIR) prism 160 may have two sides 718 and 720 at right angles to each other and of equal length, and the third or hypotenuse side 600. The illumination wedge prism 140 may also have three sides 724, 726, and 728. The sides 724 and 726 may be long with the side 724 being adjacent the hypotenuse side 600 of the right angle projection total internal reflection (TIR) prism 160. The other long side 726 may be the light entrance side of the illumination wedge prism 140. The angle between the two sides 724 and 726 may be such that the central axis of the beam of light entering the illumination wedge prism 140 may be substantially perpendicular to the light entrance side 726.

The spherical or aspherical refractive lens 143 may be mounted adjacent the light entrance side 726 of the illumination wedge prism 140. The spherical or aspherical refractive lens 143 may be designed to direct a light beam into the illumination wedge prism 140. The digital micromirror device (DMD) 150 may be mounted adjacent the side 718 of the right angle projection total internal reflection (TIR) prism 160 that may be directly opposite the light entrance side 726 of the illumination wedge prism 140. The projection lens 170 may be mounted adjacent the side 720 of the right angle projection total internal reflection (TIR) prism 160. The side 720 may serve as the light emitting surface of the coupling prism assembly 700.

In the operation of the coupling prism assembly 700, a beam of light, indicated by the phantom line 734, may be directed through the spherical or aspherical refractive lens 143 into the light entrance side 726 of the illumination wedge prism 140. The beam of light may be collimated by the spherical or the aspherical refractive lens 143. The geometry of the illumination wedge prism 140 may be such that all of the angles in the illumination cone are below the critical angle for the illumination wedge prism 140. Thus, the beam of light 734 may pass along substantially a straight line through the illumination wedge prism 140 and through the right angle projection total internal reflection (TIR) prism 160 to the digital micromirror device (DMD) 150, which is adjacent the side 718 of the right angle projection total internal reflection (TIR) prism 160. The light beam 734 may be modulated by the digital micromirror device (DMD) 150, with the modulated light beam, indicated by the phantom line 736, being reflected back into the right angle projection total internal reflection (TIR) prism 160 toward the hypotenuse side 600 thereof.

However, for the modulated light beam 736 that is reflected back into the right angle projection total internal reflection (TIR) prism 160, the situation is different from that of the incoming beam of light 734. The angle of incidence upon the hypotenuse side 600 of the right angle projection total internal reflection (TIR) prism 160 is changed by the digital micromirror device (DMD) 150 modulator mirror tilt so that substantially all of the rays of the modulated beam of light 736 may exceed the critical angle and may thus be totally internally reflected, indicated by the phantom line 738. Consequently, for the modulated beam of light 736, the hypotenuse side 600 of the right angle projection total internal reflection (TIR) prism 160 may act as a mirror and may totally internally reflect substantially all of the modulated light 736 through 90 degrees to become the modulated totally internally reflected light beam 738. The modulated totally internally reflected light beam 738 may then pass out of the right angle projection total internal reflection (TIR) prism 160 through the side 720 and into the projection lens 170 that may be adjacent the side 720.

Thus, in the coupling prism assembly 700, the light beam 734 directed into the digital micromirror device (DMD) 150 and the modulated beam 736 leaving the digital micromirror device (DMD) 150 may not interfere with each other. The spacing between the two beams 734 and 736 may be such that all constraints upon the size of the projection lens 170 may be removed. Also the spherical or aspherical refractive lens 143 at the entrance of the coupling prism assembly 700 may be close to the digital micromirror device (DMD) 150. Since the cone angle of the light beam is fixed by the magnification requirements of the system, the spherical or aspherical refractive lens 143 may have a smaller diameter than in a projection system that does not include the coupling prism assembly 700. Thus, the coupling prism assembly 700 may allow the spherical or aspherical refractive lens 143, the digital micromirror device (DMD) 150, and the projection lens 170 to be placed closer together, and may also allow the use of a smaller spherical or aspherical refractive lens 143 and/or a smaller projection lens 170 so that the size of the overall projection system may be made smaller. In spite of the size of the overall projection system being smaller, the light beam 734 directed into the coupling prism assembly 700, the modulated beam of light 736, and the modulated totally internally reflected light beam 738 may not interfere with each other In these various exemplary illustrative embodiments, the 90 degree right angle construction of the projection total internal reflection (TIR) prism 160 using BK-7 glass may make the projection total internal reflection (TIR) prism 160 very low cost, as such would conform to industry standard component tooling. The illumination wedge prism 140 may have an additional compound angle to direct the light at the correct orientation to the digital micromirror device (DMD) 150 hinge axis while maintaining a substantially flat optical path layout, which may be a further benefit that may not be realized in conventional designs.

Telecentricity at the digital micromirror device (DMD) 150 may allow the amount of offset in the projection lens 170 to be substantially minimized so the size of the projection lens 170 may be substantially optimally reduced. In these various exemplary illustrative embodiments, the projection lens 170 may use about an 18 mm focal length and about a 1 mm offset to produce a projection lens 170 design that is small, yet may provide a relatively fast throw ratio with good offset and substantially minimal keystone at the desired screen size and/or viewing distance requested by users and/or customers. In various particular illustrative exemplary embodiments, the projection lens 170 may comprise an f/2.0 projection lens stop for substantially maximum lumens.

By using the projection path 736 and 738 for the projection total internal reflection (TIR) prism 160, the air gap 710, between the illumination wedge prism 140 and the projection total internal reflection (TIR) prism 160, is not in the projection path 736 and 738, and the air gap 710 may not cause astigmatism and/or degrade image quality. By contrast, the air gap 710 between the illumination wedge prism 140 and the projection total internal reflection (TIR) prism 160 is in the illumination path 734, where the quality of the image of the light beam 734 being delivered to the digital micromirror device (DMD) 150 is not nearly as important as the overall number of the photons in the light beam 734, and the air gap 710 may have substantially no effect on the overall number of the photons in the light beam 734. The size of the air gap 710 may not be critical. In various particular exemplary illustrative embodiments, the air gap 710 may be in the range of about 0.1 mm to about 1.0 mm. In various illustrative embodiments, any air gap 710 coma/astigmatism may be corrected by a relay offset in the telecentric relay 130, for example.

Furthermore, the projection total internal reflection (TIR) prism 160 may also be assembled to the device 100 for the light projection system 105 separately from the illumination wedge prism 140, and may thus enable alignment of the projection total internal reflection (TIR) prism 160 to the mounting chassis of the device 100 to remove several tolerance stackups and/or allow drop-in mounting of the digital micromirror device (DMD) 150 without degrading image quality or requiring further alignment of the digital micromirror device (DMD) 150. For example, the projection total internal reflection (TIR) prism 160 may be adjusted at assembly to the mounting chassis of the device 100 to eliminate parallelism tolerances from the projection lens 170 to the digital micromirror device (DMD) 150, resulting in lower modulation transfer function (MTF) requirements for the projection lens 170 and/or lower precision requirements for the projection total internal reflection (TIR) prism 160 and/or the mounting chassis of the device 100.

Moreover, overfill efficiency losses may be reduced. For example, in conventional illumination devices, when a digital micromirror device (DMD) is tilted at an angle of about 26 degrees relative to an image coming from an integrator, about a 17% area overfill loss may be produced, because the image may not be focused evenly and may be highly distorted. The 17% area overfill loss means that the effective usable light may be only about 83%. However, in various illustrative embodiments, when a digital micromirror device (DMD) 150 is tilted at an angle of about 26 degrees to about 30 degress relative to the image coming from the telecentric relay 130 using the spherical or aspherical refractive 143 and reflective 144 components, using uneven airspaces to match the optical path length may result in the image being formed with good focus substantially all around and with low distortion yielding only about an 8% to about a 10% area overfill loss. The 8% area overfill loss means that the effective usable light may be about 92%, and the 10% area overfill loss means that the effective usable light may be about 90%. Consequently, the overfill area loss may be reduced by at least about 8% with respect to conventional illumination devices, which means that the effective usable light may be increased by at least about 8%, since 90%/83% is at least about 108%.

Further, no prism-to-prism assembly may be required for the illumination wedge prism 140 and the projection total internal reflection (TIR) prism 160. The back working distance may be similar to that of liquid crystal display (LCD) type lenses for liquid crystal display (LCD) panels of the same active area size, and designs for liquid crystal display (LCD) type lenses may be used with the device 100. In various illustrative embodiments, the projection lens 170, the projection total internal reflection (TIR) prism 160, and/or the digital micromirror device (DMD) 150 may be flown-in-place (FIP) for tolerance compensation and/or for better image quality from a lower modulation transfer function (MTF) projection lens 170.

In various illustrative embodiments, the device 100 for the light projection system 105 may be provided that creates a very compact optical system for a 0.55 inch (0.55") panel diagonal digital light processing (DLP) device, having a form factor that remains no more than about 35 mm in thickness, with a total optical engine volume of no more than about 80 cc. A total projector using such a device 100 for a light projection system 105, including electronics, a digital micromirror device (DMD) 150, and a thermal solution to dissipate heat produced may have a total volume of no more than about 200 cc, weigh no more than about 1 lb, and be able to fit in a pocket and/or a purse. The brightness of such a projector using such a device 100 for a light projection system 105 may be no less than about 15 to about 20 lumens, and battery operation of such a projector may be in a range of about 2 to about 4 hours, so power consumption of the sources and the thermal solution may be minimal.

In various illustrative embodiments, the device 100 for the light projection system 105 may use the single light emitting diode (LED) array 110, comprising at least one green die 800, at least one blue die 810, and at least one red die 820, disposed on a single high-power thermal package 210 in such a way as to minimize substantially the power consumption and the optical complexity, and, thus, the overall size, weight, and volume of the light projection system 105. The single light collection, integration, and etendue-matching optic element 120 comprising the tapered light pipe 200 may be enabled by the single light emitting diode (LED) array 110, and may be compact, simple, and inexpensive. Coupling the at least one green die 800, the at least one blue die 810, and the at least one red die 820 in air instead of using a conventional index-matching sealant may improve the optical efficiency and may enable use of the simple single light collection, integration, and etendue-matching optic element 120 comprising the tapered light pipe 200.

The telecentric relay 130 using the spherical or aspherical refractive 143 and reflective 144 components may substantially minimize the overall volume and may also provide a pupil 250 for controlling stray light. The telecentric relay 130 may be manufacturable using relatively inexpensive technologies and/or materials due to the relatively low light levels.

In addition, using the coupling prism assembly 700 comprising the right angle projection total internal reflection (TIR) prism 160 and the illumination wedge prism 140, as described in U.S. Pat. No. 5,309,188 to Burstyn, which was incorporated by reference herein above, may allow compact folding of the optical path within a single plane layout, in spite of the digital micromirror device (DMD) 150 hinge axis being at about 45 degrees to the package. Moreover, using the coupling prism assembly 700 may simplify assembly and substantially lower the cost and/or size/volume of a telecentric system by using standardized tooling, such as a 90 degree (right angle) projection total internal reflection (TIR) prism 160, and allowing reduction of the projection lens 170 offset to substantially the minimum field size required for market requirements and/or specifications. Furthermore, a plethora of standard liquid crystal display (LCD) lens designs may also be made applicable thereby.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A device for a light projection system, the device comprising:
    a single light emitting diode array comprising at least one green die, at least one blue die, and at least one red die;
    a single light collection, integration, and etendue-matching optic element comprising a tapered light pipe capable of collecting substantially all light emitted by the single light emitting diode array and spatially integrating the substantially all the light emitted by the single light emitting diode array;
    a telecentric relay using at least one of spherical and aspherical refractive and reflective components;
    an illumination wedge prism;
    a digital micromirror device capable of modulating the substantially all the light emitted by the single light emitting diode array;
    a projection total internal reflection prism, the projection total internal reflection prism disposed between the illumination wedge prism and the digital micromirror device, such that light from the telecentric relay passes first through the illumination wedge prism and then through the total internal reflection prism to the digital micromirror device; and;
    a projection lens, wherein the telecentric relay provides the substantially all the light emitted by the single light emitting diode array through the illumination wedge prism and through the projection total internal reflection prism to the digital micromirror device that reflects the substantially all the light emitted by the single light emitting diode array back through the projection total internal reflection prism that totally internally reflects the substantially all the light emitted by the single light emitting diode array through the projection lens.

2. The device of claim 1, wherein the single light emitting diode array comprises at least two green dice.

3. The device of claim 2, wherein the single light collection, integration, and etendue-matching optic element comprising the tapered light pipe is capable of reducing the angular output of the substantially all the light emitted by the single light emitting diode array.

4. The device of claim 1, wherein the single light emitting diode array comprises two green dice and one blue die and one red die.

5. The device of claim 4, wherein the single light collection, integration, and etendue-matching optic element comprising the tapered light pipe is capable of reducing the angular output of the substantially all the light emitted by the single light emitting diode array.

6. The device of claim 1, wherein the single light collection, integration, and etendue-matching optic element comprising the tapered light pipe is capable of reducing the angular output of the substantially all the light emitted by the single light emitting diode array.

7. The device of claim 1, wherein the telecentric relay using the at least one of the spherical and the aspherical refractive and reflective components also has a pupil for controlling stray light.

8. The device of claim 1, wherein the projection total internal reflection prism is separated by an air gap from the illumination wedge prism.

9. A device for a light projection system, the device comprising:
    a single light emitting diode array comprising at least one green die, at least one blue die, and at least one red die, the single light emitting diode array disposed on a single high-power package capable of thermally operating the single light emitting diode array at substantially maximum lumens while maintaining substantial color balance;
    a single light collection, integration, and etendue-matching optic element comprising a tapered light pipe capable of collecting substantially all light emitted by the single light emitting diode array and spatially integrating the substantially all the light emitted by the single light emitting diode array, and reducing the angular output of the substantially all the light emitted by the single light emitting diode array;
    a telecentric relay using at least one of spherical and aspherical refractive and reflective components;
    an illumination wedge prism;
    a digital micromirror device capable of modulating the substantially all the light emitted by the single light emitting diode array;
    a projection total internal reflection prism separated by an air gap from the illumination wedge prism, the projection total internal reflection prism disposed between the illumination wedge prism and the digital micromirror device, such that light from the telecentric relay passes first through the illumination wedge prism and then through the total internal reflection prism to the digital micromirror device; and;
    a projection lens, wherein the telecentric relay provides the substantially all the light emitted by the single light emitting diode array through the illumination wedge prism across the air gap and through the projection total internal reflection prism to the digital micromirror device that reflects the substantially all the light emitted by the single light emitting diode array back through the projection total internal reflection prism that totally internally reflects the substantially all the light emitted by the single light emitting diode array through the projection lens.

10. The device of claim 9, wherein the single light emitting diode array comprises at least two green dice.

11. The device of claim 10, wherein the single light collection, integration, and etendue-matching optic element comprising the tapered light pipe is capable of reducing the angular output of the substantially all the light emitted by the single light emitting diode array to a half angle of no more than about 45 degrees.

12. The device of claim 9, wherein the single light emitting diode array comprises two green dice and one blue die and one red die.

13. The device of claim 12, wherein the single light collection, integration, and etendue-matching optic element comprising the tapered light pipe is capable of reducing the angular output of the substantially all the light emitted by the single light emitting diode array to a half angle of no more than about 45 degrees.

14. The device of claim 9, wherein the single light collection, integration, and etendue-matching optic element comprising the tapered light pipe is capable of reducing the angular output of the substantially all the light emitted by the single light emitting diode array to a half angle of no more than about 45 degrees.

15. A device for a light projection system, the device comprising:
- a single light emitting diode array comprising at least one green die, at least one blue die, and at least one red die, the single light emitting diode array disposed on a single high-power package capable of thermally operating the single light emitting diode array at substantially maximum lumens while maintaining substantial color balance;
- a single light collection, integration, and etendue-matching optic element comprising a tapered light pipe capable of collecting substantially all light emitted by the single light emitting diode array and spatially integrating the substantially all the light emitted by the single light emitting diode array so the white point is substantially uniform, and reducing the angular output of the substantially all the light emitted by the single light emitting diode array;
- a telecentric relay using at least one of spherical and aspherical refractive and reflective components and a pupil for controlling stray light;
- an illumination wedge prism;
- a digital micromirror device capable of modulating the substantially all the light emitted by the single light emitting diode array;
- a projection total internal reflection prism separated by an air gap from the illumination wedge prism, the projection total internal reflection prism disposed between the illumination wedge prism and the digital micromirror device, such that light from the telecentric relay passes first through the illumination wedge prism and then through the total internal reflection prism to the digital micromirror device; and;
- a projection lens, wherein the. telecentric relay provides the substantially all the light emitted by the single light emitting diode array through the illumination wedge prism across the air gap and through the projection total internal reflection prism to the digital micromirror device that reflects the substantially all the light emitted by the single light emitting diode array back through the projection total internal reflection prism that totally internally reflects the substantially all the light emitted by the single light emitting diode array through the projection lens.

16. The device of claim 15, wherein the single light emitting diode array comprises at least two green dice.

17. The device of claim 16, wherein the single light collection, integration, and etendue-matching optic element comprising the tapered light pipe is capable of reducing the angular output of the substantially all the light emitted by the single light emitting diode array to a half angle of no more than about 45 degrees.

18. The device of claim 15, wherein the single light emitting diode array comprises two green dice and one blue die and one red die.

19. The device of claim 18, wherein the single light collection, integration, and etendue-matching optic element comprising the tapered light pipe is capable of reducing the angular output of the substantially all the light emitted by the single light emitting diode array to a half angle of no more than about 45 degrees.

20. The device of claim 15, wherein the single light collection, integration, and etendue-matching optic element comprising the tapered light pipe is capable of reducing the angular output of the substantially all the light emitted by the single light emitting diode array to a half angle of no more than about 45 degrees.

* * * * *